United States Patent
Li et al.

(10) Patent No.: US 9,425,689 B2
(45) Date of Patent: *Aug. 23, 2016

(54) LOAD REGULATION COMPENSATION MODULE AND SWITCHING CONVERTER COMPRISING THE SAME

(71) Applicant: Chengdu Monolithic Power Systems Co., Ltd., Chengdu (CN)

(72) Inventors: Lei Li, Chengdu (CN); Yike Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 163 days.

This patent is subject to a terminal disclaimer.

(21) Appl. No.: 14/247,854

(22) Filed: Apr. 8, 2014

(65) Prior Publication Data
US 2014/0300336 A1 Oct. 9, 2014

(30) Foreign Application Priority Data
Apr. 8, 2013 (CN) .......................... 2013 1 0118956

(51) Int. Cl.
*G05F 1/00* (2006.01)
*H02M 3/156* (2006.01)
*H02M 1/00* (2006.01)

(52) U.S. Cl.
CPC ..... *H02M 3/156* (2013.01); *H02M 2001/0009* (2013.01); *H02M 2001/0025* (2013.01)

(58) Field of Classification Search
CPC .................. H02M 3/1563; H02M 2003/1557; H02M 3/156; H02M 2001/0009; H02M 2001/0025
USPC ....................................................... 323/285
See application file for complete search history.

(56) References Cited

U.S. PATENT DOCUMENTS

| 8,928,305 B2 * | 1/2015 | Ueunten | ............... | H02M 3/158 323/313 |
|---|---|---|---|---|
| 2014/0266092 A1 | 9/2014 | Ueunten et al. | | |

* cited by examiner

*Primary Examiner* — Jessica Han
*Assistant Examiner* — Lorena Bruner
(74) *Attorney, Agent, or Firm* — Perkins Coie LLP

(57) ABSTRACT

A switching converter and a load regulation compensation module for improving load regulation accuracy of the switching converter. The switching converter regulates its output voltage through controlling a switch module to switch on and off based on a first reference signal and a feedback signal indicative of the output voltage. The on and off switching of the switch module generates a switching current, resulting in an average offset voltage between an internal reference ground and a package ground pin of the switching converter. The load regulation compensation module is configured to monitor the switching current, and to compensate a second reference signal having a bandgap reference voltage referenced to the internal reference ground based on the monitored switching current to generate the first reference signal, so that the average offset voltage is substantially cancelled out from the first reference signal with respect to the package ground pin.

18 Claims, 4 Drawing Sheets

LOAD REGULATION COMPENSATION MODULE AND SWITCHING CONVERTER COMPRISING THE SAME

CROSS-REFERENCE TO RELATED APPLICATION(S)

This application claims the benefit of CN application no. 201310118956.7 filed on Apr. 8, 2013 and incorporated herein by reference.

TECHNICAL FIELD

This disclosure relates generally to power converters, and more particularly relates to switching converters and load regulation compensation.

BACKGROUND

Switching converters are widely used in various electronic devices for sourcing power to the electronic devices from a power source. The electronic device(s) powered by a switching converter may be referred to as a load of the switching converter. Generally, the switching converter may be able to convert a power source voltage into an appropriate output voltage through controlling a switch module coupled to the power source voltage to switch on and off, thereby regulating power transmitted to the load.

The switching converter generally comprises a control module for controlling the switch module. The control module and the switch module in most switching converters are integrated and encapsulated in one package, and are referenced to an internal reference ground, which is usually connected to a ground pin of the package via a resistive connecting component. During the switch module switching on and off periodically, a relatively large switching current (compared with currents flowing through other internal circuits of the switching converter) may flow through the resistive component, resulting in an offset voltage from the reference ground to the package ground pin. Due to this offset voltage, the load regulation performance of the switching converter deteriorates. Load regulation of the switching converter may refer to change of the output voltage with an output current drawn by a load of the switching converter. It is an important criterion indicating the stability of the switching converter.

Typically, the control module of the switching converter regulates the output voltage by controlling the on and off switching of the switch module based on comparison of a feedback signal indicative of the output voltage with a reference signal indicative of a desired value of the output voltage, so as to achieve good load regulation. However, the reference signal is generally provided by a reference generation module integrated and encapsulated in the same package with the switch module and the control module. Therefore, the reference generation module is also referenced to the internal reference ground, and the reference signal provided bears the offset voltage with respect to the ground pin. When the load of the switching converter changes, the output current and the switching current also change, leading to variation in the offset voltage. The reference signal in consequence varies when referenced to the ground pin, which adversely worsen the load regulation.

A need therefore exists for solving the problem of influence of the offset voltage to the reference signal and the load regulation of a switching converter.

SUMMARY

In accomplishing the above and other objects, there has been provided, in accordance with an embodiment of the present disclosure, a load regulation compensation module for a switching converter. The switching converter comprises a switch module referenced to an internal reference ground connected to a package ground pin via a resistive component, the switch module is switched on and off based on a feedback signal indicative of an output voltage of the switching converter and a first reference signal indicative of a desired value of the output voltage, wherein the on and off switching of the switch module generates a switching current flowing through the resistive component, resulting in an average offset voltage between the internal reference ground and the package ground pin. The load regulation compensation module comprises: a current sense circuit, configured to sense the switching current flowing through the resistive component, and to provide a sense signal indicative of that switching current; a first filtering circuit, configured to receive the sense signal, and filter the sense signal to provide a first average signal indicative of an average of the sense signal; a gain circuit, configured to receive the first average signal, and to apply a first gain to the first average signal to provide a compensation signal; and a superposing circuit, configured to receive the compensation signal and a second reference signal having a bandgap reference voltage with respect to the internal reference ground and, and to compensate the second reference signal with the compensation signal to generate the first reference signal, so that the average offset voltage is substantially cancelled out from the first reference signal with respect to the package ground pin.

In addition, there has been provided, in accordance with an embodiment of the present disclosure, a switching converter comprising: an input port configured to receive an input voltage; an output port configured to provide an output voltage; an internal reference ground connected to a package ground pin via a resistive component; a switch module having a first terminal coupled to the input port, a second terminal coupled to the output port, a third terminal coupled to the internal reference ground, and a fourth terminal configured to receive a control signal, wherein the switch module is configured to switch on and off periodically with a substantially constant on time in response to the control signal to convert the input voltage into the output voltage, and wherein the on and off switching of the switch module generates a switching current flowing through the resistive component, resulting in an average offset voltage between the internal reference ground and the package ground pin; a load regulation module configured to receive a feedback signal indicative of the output voltage and a first reference signal indicative of a desired value of the output voltage, and configured to provide a regulation signal indicative of a difference between the feedback signal and the first reference signal, and to compare the regulation signal with a sawtooth signal to generate a comparison signal, wherein the comparison signal is configured to trigger a timer to start timing so as to generate the control signal; and a load regulation compensation module configured to receive a second reference signal having a bandgap reference voltage with respect to the internal reference ground, to monitor the switching current flowing through the resistive component, and to compensate the second reference signal based on the monitored switching current to generate the first reference signal, so that the average offset voltage is substantially cancelled out from the first reference signal with respect to the package ground pin.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

The use of the same reference label in different drawings indicates the same or like components or structures with substantially the same functions for the sake of simplicity.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
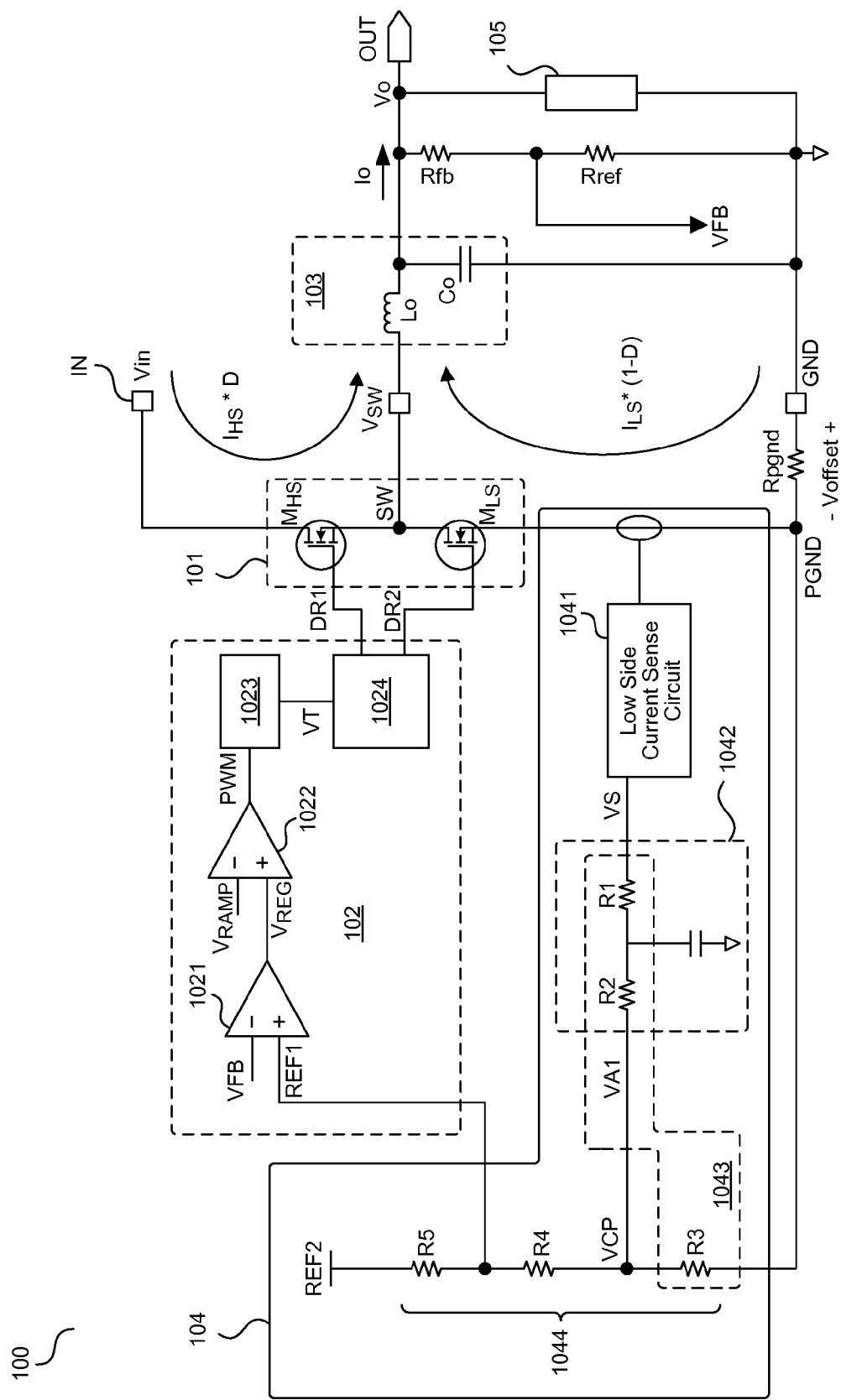
FIG. 1 illustrates a block diagram of a switching converter 100 in accordance with an embodiment of the present invention.

FIG. 1 illustrates a block diagram of a switching converter 100 in accordance with an embodiment of the present invention. The switching converter 100 may have an input port IN configured to receive an input voltage Vin; and an output port OUT configured to provide an output voltage Vo and an output current Io for supplying a load 105. The switching converter 100 may comprise a switch module 101 having a first terminal coupled to the input port IN, a second terminal coupled to the output port OUT, a third terminal coupled to the reference ground PGND, and a fourth terminal configured to receive a control signal (e.g. the control signal is illustrated in FIG. 1 to comprise a first control signal DR1 and a second control signal DR2), wherein the switch module 101 is configured to switch on and off periodically in response to the control signals DR1 and DR2 to convert the input voltage Vin into the output voltage Vo. The switching converter 100 may further comprise a load regulation module 102, configured to receive a feedback signal $V_{FB}$ indicative of the output voltage Vo, and a first reference signal REF1 indicative of a desired value of the output voltage Vo. For example, the feedback signal $V_{FB}$ may be a scaled down voltage of the output voltage Vo, and the first reference signal REF1 may be a scaled down voltage of the desired output voltage value. Based on the feedback signal $V_{FB}$ and the first reference signal REF1, the load regulation module 102 is further configured to provide the control signals (e.g. the first control signal DR1 and the second control signal DR2 in FIG. 1) to the switch module 101 for controlling the on and off switching of the switch module 101. In the example of FIG. 1, the load regulation module 102 implements constant on time control scheme, that is to say, the control signal provided drives the switch module 101 to switch on and off with a substantially constant on time during each switching period.

In the exemplary embodiment as shown in FIG. 1, the switch module 101 is illustrated as to comprise a high side switch $M_{HS}$ (main switch) and a low side switch $M_{LS}$ coupled in series between the input port IN and the reference ground PGND, wherein the high side switch $M_{HS}$ and the low side switch $M_{LS}$ have a common connection SW which is coupled to the output port OUT via e.g. an output filter module 103. The common connection SW forms a switching output terminal that provides a switching voltage $V_{SW}$. The switching voltage $V_{SW}$ normally has a rectangular waveform generated due to the high side switch $M_{HS}$ coupling the input voltage Vin to the switching output terminal SW when it is turned on and cutting the input voltage Vin off from the switching output terminal SW when it is turned off. The output filter module 103 is configured to filter the switching voltage $V_{SW}$ so as to provide the smoothed output voltage Vo. In the exemplary embodiment of FIG. 1, the output filter module 103 is illustrated as an example to comprise an inductive power storage device Lo (e.g. an output inductor Lo) coupled between the switching output terminal SW and the output port OUT, and a capacitive power storage device Co (e.g. an output capacitor Co) coupled between the output port OUT and the package ground pin GND. The configuration of the high side switch $M_{HS}$ and the low side switch $M_{LS}$ in the switching converter 100 shown in FIG. 1 is based on buck (step-down) type converter topology, thus the switching converter 100 may be referred to as a buck (step down) switching converter. The high side switch $M_{HS}$ can be referred to as a main switch in this example. The switch on and off of the switch module 101 is considered as in consistence with the switch on and off of the main switch. The load regulation module 102 is configured to drive the low side switch $M_{LS}$ to switch on and off in complementary with the high side switch $M_{HS}$. That is to say, when the high side switch $M_{HS}$ is turned on, the low side switch $M_{LS}$ is turned off; when the high side switch $M_{HS}$ is turned off, the low side switch $M_{LS}$ is turned on.

In the example of FIG. 1, the load regulation module 102 has a first regulation input terminal and a second regulation input terminal respectively configured to receive the feedback signal $V_{FB}$ and the first reference signal REF1. The load regulation module 102 is configured to provide a regulation signal $V_{REG}$ indicative of the difference between the feedback signal $V_{FB}$ and the first reference signal REF1, and to compare the regulation signal $V_{REG}$ with a sawtooth signal $V_{RAMP}$ to generate a comparison signal PWM. The load regulation module 102 is further configured to trigger a timer by the comparison signal PWM to start timing so as to generate a constant on time control signal. In FIG. 1, the constant on time control signal may comprise a first control signal DR1 having a substantially constant pulse width and a second control signal DR2 having complementary logic levels with the first control signal DR1. For example, when the first control signal DR1 has high logic level, the second control signal DR2 has low logic level; when the first control signal DR1 has low logic level, the second control signal DR2 has high logic level. The first control signal DR1 and the second control signal DR2 are respectively configured to control the high side switch $M_{HS}$ and the low side switch $M_{LS}$ so that the high side switch $M_{HS}$ and the low side switch $M_{LS}$ switch on and off in complementary, wherein the high side switch $M_{HS}$ has a substantially constant on time during each switching period. The load regulation module 102 regulates the output voltage Vo by controlling the main switch $M_{HS}$ of the switch module 101 to switch on and off with a substantially constant on time is generally referred to as constant on time control scheme in the present disclosure. The switch module 101 is operated in constant on time switching mode in this situation. In accordance with an embodiment of the present invention, the switching converter 100 may further comprise a feedback module coupled to the output port OUT and configured to monitor the output voltage Vo so as to provide the feedback signal $V_{FB}$. In FIG. 1, the feedback module is exemplarily illustrated as to comprise a first feedback resistor Rfb and a second feedback resistor Rref coupled in series between the output port OUT and the ground pin GND, wherein the first feedback resistor Rfb and the second feedback resistor Rref has a common connection configured to provide the feedback signal $V_{FB}$.

In accordance with an embodiment of the present invention, the load regulation module 102 may comprise a load regulation amplifier 1021, a comparator 1022, a timer 1023 and a logic circuit 1024. The load regulation amplifier 1021 according to an exemplary embodiment may comprise a first amplifier input terminal configured to receive the feedback signal $V_{FB}$, a second amplifier input terminal configured to receive the first reference signal REF1, and an amplifier output terminal configured to provide the regulation signal $V_{REG}$. The comparator 1022 has a first comparator input terminal configured to receive the regulation signal $V_{REG}$, a second comparator input terminal configured to receive the sawtooth signal $V_{RAMP}$, and a comparator output terminal configured to provide the comparison signal PWM, wherein the comparison signal PWM is regulated by the regulation signal $V_{REG}$. The timer 1023 has a timer control terminal and a timer output terminal, wherein the timer control terminal is configured to receive the comparison signal PWM, the timer 1023 is triggered by the comparison signal PWM to time for a substantially constant time $T_{ON}$ and to provide a time signal VT indicative of the constant time $T_{ON}$ at the timer output terminal. The logic circuit 1024 has a logic input terminal and a logic output terminal, the logic input terminal is configured to receive the time signal VT, the logic circuit 1024 is configured to provide the constant on time control signal based on the time signal VT at the logic output terminal, wherein the constant on time control signal is configured to drive the switch module 101 to switch on and off in constant on time switching mode, and wherein the on time of the switch module 101 in each switching period substantially equals to the constant time $T_{ON}$. In the example of FIG. 1, the logic output terminal is illustrated as to comprise a first logic output terminal and a second logic output terminal respectively configured to provide the first control signal DR1 and the second control signal DR2, i.e. the constant on time control signal comprises the first control signal DR1 and the second control signal DR2 in this case, wherein the first control signal DR1 and the second control signal DR2 are respectively configured to control the high side switch $M_{HS}$ and the low side switch $M_{LS}$ to switch on and off in complementary, and wherein the first control signal DR1 is configured to drive the high side switch $M_{HS}$ on for substantially the constant time $T_{ON}$ during each switching period.

During operation of the switching converter 100, a switching current is generated from the on and off switching of the switch module 101. For example, in FIG. 1, a high side current $I_{HS}$ and a low side current $I_{LS}$ are respectively generated from the on and off switching of the high side switch $M_{HS}$ and the low side switch $M_{LS}$, the switching current comprises the high side current $I_{HS}$ and the low side current $I_{LS}$. The switching current, either the high side current $I_{HS}$ or the low side current $I_{LS}$ flowing to the reference ground PGND and through the resistive component Rpgnd to the ground pin GND may result in an average offset voltage Voffset presenting between the internal reference ground PGND and the package ground pin GND. This offset voltage Voffset varies with the load 105 variation (i.e. the load current Io variation), resulting in variation in the first reference signal REF1 when referenced to the ground pin GND. Since the ground pin is the actual ground reference to the entire switching converter 100 and its load 105, the variation in the first reference signal REF1 when referenced to the ground pin GND is harmful to the load regulation accuracy of the switching converter 100.

In accordance with an embodiment of the present invention, the switching converter 100 further comprises a load regulation compensation module 104. The load regulation compensation module 104 is configured to compensate the first reference signal REF1 so as to substantially cancel the offset voltage Voffset out from the first reference signal REF1 when referenced to the ground pin. In an exemplary embodiment, the load regulation compensation module 104 is configured to receive a second reference signal REF2 having a bandgap reference voltage VBG with respect to the reference ground PGND, wherein the second reference signal REF2 may be provided by a bandgap reference circuit which is integrated into the switching converter 100 and is well known to those skilled in the art. The load regulation compensation module 104 is further configured to monitor the switching current (either the high side current $I_{HS}$ or the low side current $I_{LS}$ depending on the topology of the switching converter 100) flowing through the resistive component Rpgnd, and to compensate the second reference signal REF2 based on the monitored switching current so as to generate the first reference signal REF1 with the offset voltage Voffset substantially cancelled out from the first reference signal REF1 when referenced to the ground pin GND. Typically, in a switching converter with constant on time control scheme, such as the switching converter 100, the control to the switch module 101 does not need the switching current or the load/output current Io information, thus the load regulation module 102 does not provide signal(s) that represents the switching current (high side current $I_{HS}$ or low side current $I_{LS}$) or the load/output current Io.

In the exemplary embodiment of FIG. 1, the switching current flowing thought the resistive component Rpgnd is illustrated to be the low side current $I_{LS}$. However, this is just for purpose of illustration and should not be interpreted as limitations. In other embodiments, the high side current $I_{HS}$ may flow through the resistive component Rpgnd, leading to the average offset voltage Voffset. During the on and off switching of the switch module 101, the high side switch $M_{HS}$ has the substantially constant on time $T_{ON}$ in each switching period, the low side switch $M_{LS}$ is switched on and off in complementary with the high side switch $M_{HS}$. A fraction of time that the high side switch $M_{HS}$ is switched on (i.e. the on time $T_{ON}$ of the high side switch $M_{HS}$) during the total time of the switching period may be referred to as an on duty cycle of the switch module 101, denoted by D in this disclosure. In this circumstance, the percentage of the on time of the low side switch $M_{LS}$ to the switching period is 1−D. That is to say, the percentage of the time duration that the low side current $I_{LS}$ flows through the resistive component Rpgnd is 1−D. Therefore, it is desired in this example that the load regulation compensation module 104 can compensate the first reference signal REF1 only during the on time of the low side switch $M_{LS}$ to improve the compensation accuracy.

In accordance with an embodiment of the present invention, the load regulation compensation module 104 may comprise: a current sense circuit 1041, configured to sense the switching current (the low side current $I_{LS}$ in the example of FIG. 1) flowing through the resistive component Rpgnd, and to provide a sense signal VS indicative of that switching current; a first filtering circuit 1042, configured to receive the sense signal VS and filter the sense signal VS to provide a first average signal VA1 indicative of an average of the sense signal VS; a gain circuit 1043, configured to receive the first average signal VA1 and to apply a first gain G1 to the first average signal VA1 to provide a compensation signal VCP; and a superposing circuit 1044, configured to receive the second reference signal REF2 and the compensation signal VCP respectively, and to compensate the second reference signal REF2 with the compensation signal VCP to generate the first reference signal REF1, so that the offset voltage Voffset is substantially cancelled out from the first reference signal REF1 with respect to the ground pin GND.

In the exemplary embodiment of FIG. 1, the current sense circuit 1041 needs to sense the low side current $I_{LS}$ which flows through the resistive component Rpgnd. In one embodiment of the present invention, the load regulation compensation module 104 is configured to provide the sense signal VS through directly sensing the low side current $I_{LS}$. In this case, referring to FIG. 1, the current sense circuit 1041 may comprise a low side current sense circuit coupled to the low side switch $M_{LS}$. The low side current sense circuit is configured to monitor the low side current $I_{LS}$ and to provide a low side sense signal indicative of the low side current $I_{LS}$, which is provided as the sense signal VS. In one embodiment of the present invention, the low side current sense circuit may comprise: a sense resistor electrically coupled to the low side switch $M_{LS}$ in series, and a low side current sense amplifier having a first sense terminal, a second sense terminal and a sense output terminal, wherein the first sense terminal is electrically coupled to an end of the sense resistor, and wherein the second sense terminal is electrically coupled to the other end of the sense resistor, and wherein the sense output terminal is configured to provide the low side sense signal as the sense signal VS. In an exemplary embodiment of the present invention, the low side current sense circuit has a low side sense gain $K_L$, therefore, the sense signal VS can be expressed as $VS=I_{LS}*K_L$.

In the exemplary embodiment of FIG. 1, the first filtering circuit 1042 may comprise: a first resistor R1, having a first resistor terminal and a second resistor terminal, wherein the first resistor terminal is configured to receive the sense signal VS; a first capacitor C1, having a first capacitor terminal and a second capacitor terminal, wherein the first capacitor terminal is coupled to the second resistor terminal, and wherein the second capacitor terminal is connected to the internal reference ground PGND; and a second resistor R2, having a third resistor terminal and a fourth resistor terminal, wherein the third resistor terminal is electrically coupled to the second resistor terminal, and the fourth resistor terminal is configured to provide the first average signal VA1. For the exemplary embodiment of FIG. 1, the sense signal VS is indicative of the low side current $I_{LS}$ flowing through the resistive component Rpgnd in the buck switching converter 100. Thus, the first average signal VA1 represents the average of the low side current $I_{LS}$ and can be expressed by $VA1=Io*(1-D)*K_L$. The output current Io may refer to an average of the high side current $I_{HS}$ and the low side current $I_{LS}$ during each switching period.

In accordance with an embodiment of the present invention, the gain circuit 1043 may comprise: the first resistor R1, the second resistor R2 and a third resistor R3, wherein the third resistor R3 has a fifth resistor terminal and a sixth resistor terminal, and wherein the fifth resistor terminal is electrically coupled to the fourth resistor terminal, the sixth resistor terminal is connected to the internal reference ground PGND, and wherein the gain circuit 1043 is configured to provide the compensation signal VCP at the fifth resistor terminal.

For the buck switching converter 100 of FIG. 1, the average offset voltage Voffset is negative with respect to the ground pin GND due to the switching current (e.g. the low side current $I_{LS}$) flowing through the resistive component Rpgnd in the direction from the ground pin GND to the output port OUT. In this example, the average offset voltage Voffset can be expressed by $Voffset=Io*(1-D)*Rpgnd$. The superposing circuit 1044 of the load regulation compensation module 104 is configured to add the compensation signal VCP to a signal indicative of the second reference signal REF2 (including the second reference signal REF2) so as to cancel the average offset voltage Voffset. In an exemplary embodiment, referring to FIG. 1, the superposing circuit 1044 may comprise an addition circuit configured to receive the compensation signal VCP and the second reference signal REF2 respectively, and to add the compensation signal VCP with the second reference signal REF2 to generate the first reference signal REF1. In FIG. 1, the addition circuit is exemplarily illustrated as to comprise the third resistor R3, a fourth resistor R4 having a seventh resistor terminal and an eighth resistor terminal, and a fifth resistor R5 having a ninth resistor terminal and a tenth resistor terminal, wherein the seventh resistor terminal is electrically coupled to the fifth resistor terminal, the eighth resistor terminal is electrically coupled to the ninth resistor terminal to form a superposing output terminal of the superposing circuit 1044, and wherein the tenth resistor terminal is configured to receive the second reference signal REF2, and the superposing output terminal is configured to provide the first reference signal REF1. In this example, the value of the third resistor R3 is chosen to be much smaller than that of the first resistor R1, the second resistor R2, the fourth resistor R4 and the fifth resistor R5, then the first reference signal REF1 when referenced to the ground pin GND can be expressed by the expression (1) below.

$$REF1 \approx \frac{REF2 \times (R3+R4)}{(R3+R4+R5)} + \frac{Io \times K_L \times (1-D) \times R3}{R1+R2} \times \frac{R5}{R4+R5} - Io \times (1-D) \times Rpgnd \quad (1)$$

From the expression (1), it can be seen that through appropriately choosing the low side sense gain $K_L$ and the values of the first resistor R1, the second resistor R2 and the third resistor R3 in the second item $$\left[ \frac{Io \times K_L \times (1-D) \times R3}{R1+R2} \times \frac{R5}{R4+R5} \right],$$

the third item [Io×(1−D)×Rpgnd], which represents the offset voltage Voffset, may be substantially cancelled out by the second item. In this way, the offset voltage Voffset can be cancelled out from the first reference signal REF1 when referenced to the ground pin GND. In accordance with the exemplary embodiment of FIG. 1, the load regulation compensation module 104 is integrated in the switching converter 100, which substantially eliminates the influence of the offset voltage Voffset to the first reference signal REF1 with respect to the ground pin GND. Thus, the load regulation can be improved.

Figure 2:
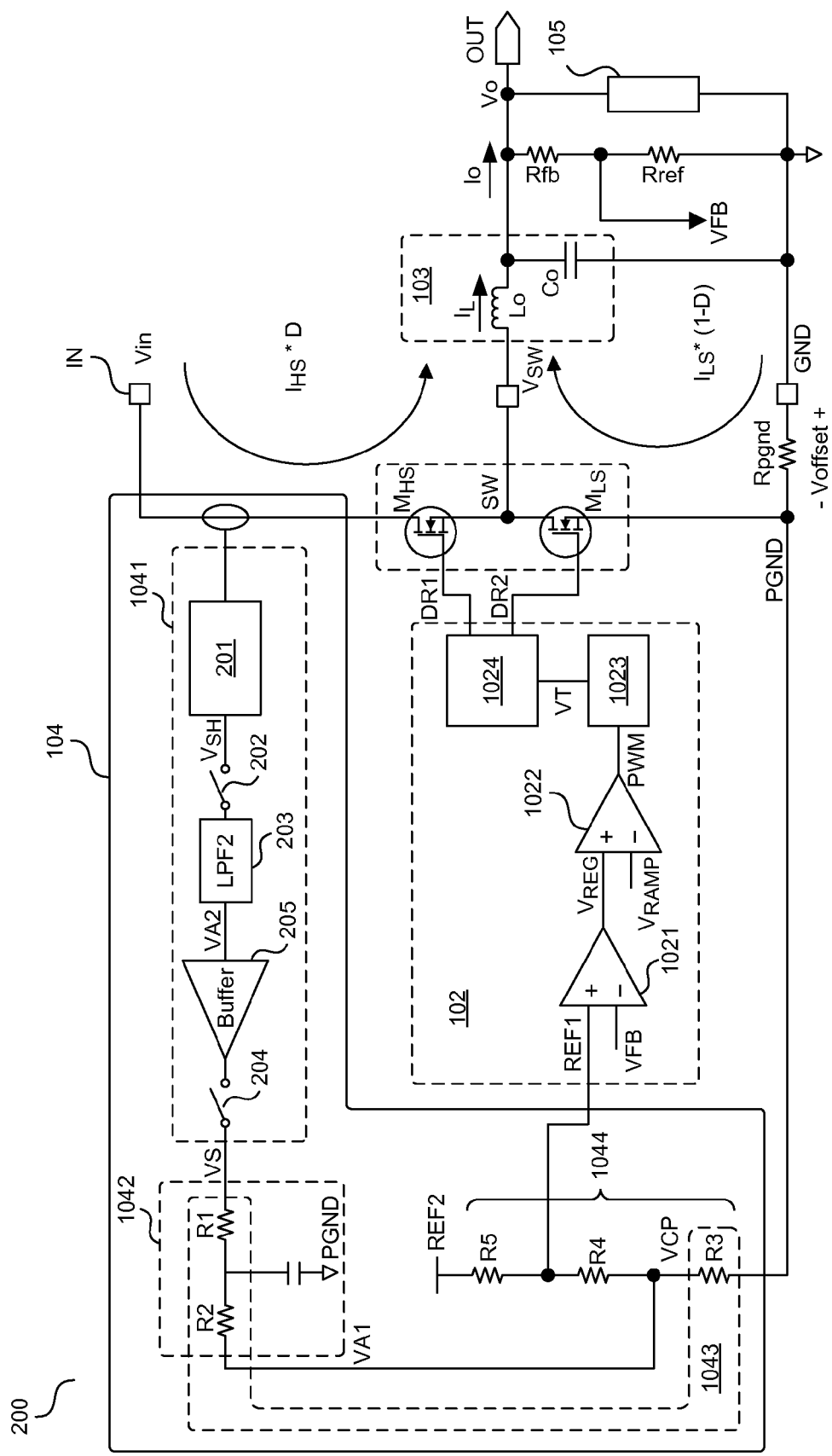
FIG. 2 illustrates a block diagram of a switching converter 200 in accordance with an embodiment of the present invention.

FIG. 2 illustrates a block diagram of a switching converter 200 in accordance with an embodiment of the present invention. Components or structures of the switching converter 200 in FIG. 2 with substantially the same functions as those of the switching converter 100 shown in FIG. 1 are identified by the same reference labels for the sake of simplicity. In FIG. 2, the switching converter 200 has the buck (step-down) type converter topology, thus may be referred to as a buck (step down) switching converter. The average offset voltage Voffset is resulted from the low side current $I_{LS}$ flowing through the resistive component Rpgnd. Therefore, the load regulation compensation module 104 needs to monitor the load side current $I_{LS}$ to compensate the first reference signal REF1. In the example of FIG. 2, different from the example of FIG. 1, the current sense module 1041 is configured to provide the sense signal VS indicative of the low side current $I_{LS}$ indirectly through sensing the high side current $I_{HS}$.

In accordance with the exemplary embodiment of FIG. 2, the current sense circuit 1041 may comprise: a high side current sense circuit 201, a first switching device 202, a second filtering circuit (LPF2) 203, and a second switching device 204. The high side current sense circuit 201 is coupled to the high side switch $M_{HS}$ to monitor the high side current $I_{HS}$, and to provide a high side sense signal $V_{SH}$ indicative of the high side current $I_{HS}$. The first switching device 202 has a first switch terminal and a second switch terminal, wherein the first switch terminal is configured to receive the high side sense signal $V_{SH}$, the first switching device 202 is configured to switch on and off in synchronous with the high side switch $M_{HS}$ (i.e. the first switching device 202 switches on when the high side switch $M_{HS}$ is switched on, and switches off when the high side switch $M_{HS}$ is switched off) so as to transmit the high side sense signal $V_{SH}$ to the second switch terminal during the on time of the high side switch $M_{HS}$. The second filtering circuit 203 has a filter input terminal and a filter output terminal, wherein the filter input terminal is electrically coupled to the second switch terminal of the first switching device 202 so as to receive the high side sense signal $V_{SH}$ during the on time of the high side switch $M_{HS}$, the second filtering circuit 203 is configured to provide a second average signal VA2 indicative of the average of the sum of the high side current $I_{HS}$ and the low side current $I_{LS}$ (i.e. the output current Io) at the filter output terminal. The second switching device 204 has a third switch terminal and a fourth switch terminal, wherein the third switching terminal is configured to receive the second average signal VA2, the second switching device 204 is configured to synchronously switch on and off with the low side switch $M_{LS}$ (i.e. the second switching device 204 switches on when the low side switch $M_{LS}$ is switched on, and switches off when the low side switch $M_{LS}$ is switched off) so as to transmit the second average signal VA2 to the fourth switch terminal during the on time of the low side switch $M_{LS}$. In this way, the signal provided at the fourth switch terminal of the second switching device 204 is indicative of an average of the low side current $I_{LS}$ and is provided as the sense signal VS. In accordance with an embodiment of the present invention, the high side current sense circuit 201 has a high side sense gain $K_H$, the high side sense signal $V_{SH}$ can be expressed as $V_{SH}=I_{LS}*K_H$, then the second average signal VA2 can be expressed as VA2=$K_H$*Io, the sense signal VS can be expressed by VS=$K_H$*Io*(1−D).

In accordance with the exemplary embodiment of FIG. 2, the current sense circuit 1041 may further comprise a voltage buffer 205. The voltage buffer 205 is electrically coupled to the filter output terminal of the second filtering circuit 203 to receive the second average signal VA2 at a buffer input terminal, and is coupled to the third switch terminal at a buffer output terminal. The voltage buffer 205 is configured to enhance the current driving ability of the second average signal VA2 and to provide the enhanced second average signal at the third switch terminal.

In FIG. 2, the first filtering circuit 1042, the gain circuit 1043 and the superposing circuit 1044 of the load regulation compensation module 104 have the same configuration as that shown in FIG. 1. Thus, the first reference signal REF1 of FIG. 2 when referenced to the ground pin GND can be expressed by the expression (2).

$$REF1 \approx \frac{REF2 \times (R3+R4)}{R3+R4+R5} + \frac{Io \times K_H \times (1-D) \times R3}{R1+R2} \times \frac{R5}{R4+R5} - Io \times (1-D) \times Rpgnd \quad (2)$$

From the expression (2), it can be seen that through appropriately choosing the high side sense gain $K_H$ and the values of the first resistor R1, the second resistor R2

$$\left[ \frac{Io \times K_H \times (1-D) \times R3}{R1+R2} \times \frac{R5}{R4+R5} \right],$$

and the third resistor R3 in the second item the third item [Io×(1−M×Rpgnd], which represents the offset voltage Voffset, may be substantially cancelled out by the second item. In this way, the offset voltage Voffset can be cancelled out from the first reference signal REF1 when referenced to the ground pin GND. In accordance with the exemplary embodiment of FIG. 2, the load regulation compensation module 104 is integrated in the switching converter 200, which substantially eliminates the influence of the offset voltage Voffset to the first reference signal REF1 with respect to the ground pin GND. Thus, the load regulation of the switching converter 200 can be improved.

Figure 3:
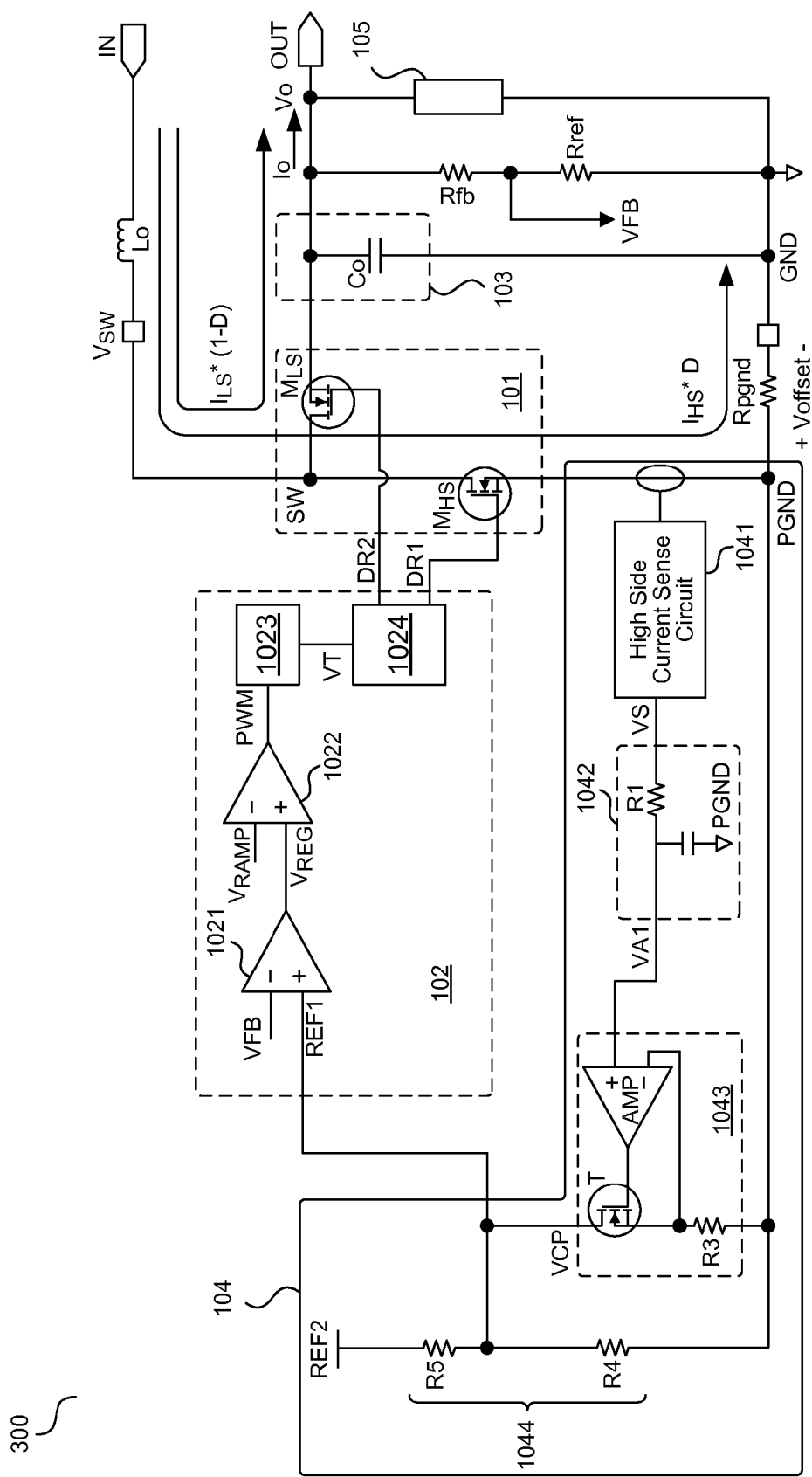
FIG. 3 illustrates a block diagram of a switching converter 300 in accordance with an embodiment of the present invention.

FIG. 3 illustrates a block diagram of a switching converter 300 in accordance with an embodiment of the present invention. Components or structures of the switching converter 300 in FIG. 3 with substantially the same functions as those of the switching converter 100 shown in FIG. 1 are identified by the same reference labels for the sake of simplicity. In FIG. 3, the switch module 101 is still illustrated as to comprise a high side switch $M_{HS}$ and a low side switch $M_{LS}$, the high side switch $M_{HS}$ is electrically coupled between the input port IN and the internal reference ground PGND, the low side switch $M_{LS}$ is electrically coupled between the input port IN and the output port OUT. The high side switch $M_{HS}$ and the low side switch $M_{LS}$ has a common connection which forms a switching output terminal SW that provides a switching voltage V. The switching output terminal SW is coupled through an inductive power storage device Lo for example to the input port IN. The low side switch $M_{LS}$ is coupled to the output port OUT through a capacitive power storage device Co, which may function as the output filter module 103. The switch module 101 still receives a control signal at the fourth terminal, for example the control signal is illustrated in FIG. 3 to comprise a first control signal DR1 and a second control signal DR2 that are respectively configured to drive the high side switch $M_{HS}$ and the low side switch $M_{LS}$ to switch on and off in complementary with the on time of the high side switch $M_{HS}$ remains substantially constant during each switching period. In this exemplary embodiment of FIG. 3, the configuration of the high side switch $M_{HS}$ and the low side switch $M_{LS}$ in the switching converter 300 is based on boost (step-up) type converter topology, thus the switching converter 300 may be referred to as a boost (step-up) switching converter. The high side switch $M_{HS}$ can be referred to as a main switch in this example.

In accordance with the exemplary embodiment of FIG. 3, the load regulation module 102 of the boost switching converter 300 may have the same configuration and function as that of the switching converters 100 and 200. The load regulation module 102 in FIG. 3 may also comprise: the load regulation amplifier 1021, the comparator 1022, the timer 1023 and the logic circuit 1024 etc. The load regulation module 102 in FIG. 3 has the same operation fashions and principles as that of FIG. 1 and FIG. 2. Therefore, these operation fashions and principles are not described in detail again for the sake of simplicity. However, it should be understood by those skilled in the art that, although the load regulation module 102 in FIG. 3 has the same configuration and function as that of FIG. 1 and FIG. 2, it does not mean that the load regulation module 102 in FIG. 3 has exactly the same circuit elements and parameters as that of FIG. 1 and FIG. 2. In contrast, one of ordinary skill in the art can change the circuit elements and parameters according to practical design/application requirements.

In accordance with the exemplary embodiment of FIG. 3, it is still considered that the switch on and off of the switch module 101 is in consistence with the switch on and off of the main switch $M_{HS}$. The load regulation module 102 id configured to provide the control signal, e.g. comprising the first control signal DR1 and the second control signal DR2 to respectively drive the high side switch $M_{HS}$ and the low side switch $M_{LS}$, wherein the high side switch $M_{HS}$ is driven to switch on and off with a substantially constant on time during each switching period, and wherein the low side switch $M_{LS}$ is driven to switch on and off in complementary with the high side switch $M_{HS}$. The on duty cycle of the switch module 101 still refers to the fraction of time that the high side switch $M_{HS}$ is switched on (i.e. the on time $T_{ON}$ of the high side switch $M_{HS}$) during the total time of the switching period. In the switching converter 300, the high side current $I_{HS}$ flows through the resistive component Rpgnd, resulting in the average offset Voffset. In this situation, it is desired that the load regulation compensation module 104 can compensate the first reference signal REF1 only during the on time of the high side switch $M_{HS}$ to improve the compensation accuracy.

In accordance with the exemplary embodiment of FIG. 3, the load regulation compensation module 104 may comprise: a current sense circuit 1041, configured to sense the switching current (the high side current $I_{HS}$ in the example of FIG. 3) flowing through the resistive component Rpgnd, and to provide a sense signal VS indicative of that switching current; a first filtering circuit 1042, configured to receive the sense signal VS and filter the sense signal VS to provide a first average signal VA1 indicative of an average of the sense signal VS; a gain circuit 1043, configured to receive the first average signal VA1 and to apply a first gain G1 to the first average signal VA1 to provide a compensation signal VCP; and a superposing circuit 1044, configured to receive the second reference signal REF2 and the compensation signal VCP respectively, and to compensate the second reference signal REF2 with the compensation signal VCP to generate the first reference signal REF1, so that the offset voltage Voffset is substantially cancelled out from the first reference signal REF1 with respect to the ground pin GND.

In the exemplary embodiment of FIG. 3, the current sense circuit 1041 needs to sense the high side current $I_{HS}$ which flows through the resistive component Rpgnd. In one embodiment of the present invention, the load regulation compensation module 104 is configured to provide the sense signal VS through directly sensing the high side current $I_{HS}$. In this case, referring to FIG. 3, the current sense circuit 1041 may comprise a high side current sense circuit coupled to the high side switch $M_{HS}$. The high side current sense circuit is configured to monitor the high side current $I_{HS}$ and to provide a high side sense signal indicative of the high side current $I_{HS}$, which is provided as the sense signal VS. In one embodiment of the present invention, the high side current sense circuit may comprise: a sense resistor electrically coupled to the high side switch $M_{HS}$ in series, and a high side current sense amplifier having a first sense terminal, a second sense terminal and a sense output terminal, wherein the first sense terminal is electrically coupled to an end of the sense resistor, and wherein the second sense terminal is electrically coupled to the other end of the sense resistor, and wherein the sense output terminal is configured to provide the high side sense signal as the sense signal VS. In an exemplary embodiment of the present invention, the high side current sense circuit has a high side sense gain $K_H$, therefore, the sense signal VS can be expressed as $VS = I_{HS} * K_H$.

In the exemplary embodiment of FIG. 3, the first filtering circuit 1042 may comprise: a first resistor R1, having a first resistor terminal and a second resistor terminal, wherein the first resistor terminal is configured to receive the sense signal VS; and a first capacitor C1, having a first capacitor terminal and a second capacitor terminal, wherein the first capacitor terminal is coupled to the second resistor terminal, and wherein the second capacitor terminal is connected to the internal reference ground PGND; the second resistor terminal is configured to provide the first average signal VA1. For the exemplary embodiment of FIG. 3, the sense signal VS is indicative of the high side current $I_{HS}$ flowing through the resistive component Rpgnd in the boost switching converter 300. Thus, the first average signal VA1 represents the average of the high side current $I_{HS}$ and can be expressed by VA1=Io*D*$K_H$. The output current Io may refer to an average of the high side current $I_{HS}$ and the low side current $I_{LS}$ during each switching period.

In accordance with an embodiment of the present invention, the gain circuit 1043 may comprise: a gain amplifier AMP, a gain transistor T and a third resistor R3. The gain amplifier has a non-inverting input terminal, an inverting input terminal and an amplifier output terminal, wherein the non-inverting input terminal is electrically coupled to the second resistor terminal to receive the first average signal VA1. The gain transistor T has a first transistor terminal, a second transistor terminal and a transistor control terminal, wherein the transistor control terminal is electrically coupled to the amplifier output terminal. The third resistor R3 has a fifth resistor terminal and a sixth resistor terminal, wherein the fifth resistor terminal is electrically coupled to the inverting input terminal of the gain amplifier AMP and the first transistor terminal of the gain transistor T, the sixth resistor terminal is connected to the internal reference ground PGND. The gain circuit 1043 is configured to provide the compensation signal VCP at the second transistor terminal of the gain transistor T.

For the boost switching converter 300 of FIG. 3, the average offset voltage Voffset is positive with respect to the ground pin GND due to the switching current (e.g. the high side current $I_{HS}$) flowing through the resistive component Rpgnd in the direction from the input port IN to the ground pin GND. In this example, the average offset voltage Voffset can be expressed by Voffset=Io*D*Rpgnd. The superposing circuit 1044 of the load regulation compensation module 104 is configured to subtract the compensation signal VCP from a signal indicative of the second reference signal REF2 (including the second reference signal REF2) so as to cancel the average offset voltage Voffset. In an exemplary embodiment, referring to FIG. 3, the superposing circuit 1044 may comprise a subtract circuit configured to receive the compensation signal VCP and the second reference signal REF2 respectively, and to subtract the compensation signal VCP with the second reference signal REF2 to generate the first reference signal REF1. In FIG. 3, the subtract circuit is exemplarily illustrated as to comprise a fourth resistor R4 having a seventh resistor terminal and an eighth resistor terminal, and a fifth resistor R5 having a ninth resistor terminal and a tenth resistor terminal, wherein the seventh resistor terminal is connected to the internal reference ground PGND, the eighth resistor terminal is electrically coupled to the ninth resistor terminal to form a superposing output terminal of the superposing circuit 1044, and wherein the tenth resistor terminal is configured to receive the second reference signal REF2, and the superposing output terminal is configured to provide the first reference signal REF1. In this example, the subtraction of the compensation signal VCP and the second reference signal REF2 is based on the KCL at the superposing output terminal. The first reference signal REF1 of the switching converter 300 when referenced to the ground pin GND can be expressed by the expression (3) below.

$$REF1 \approx \frac{REF2 \times R4}{R4 + R5} - \frac{Io \times K_H \times D \times R4 \times R5}{(R4 + R5) \times R3} + Io \times D \times Rpgnd \quad (3)$$

From the expression (3), it can be seen that through appropriately choosing the high side sense gain $K_H$ and the value of the third resistor R3 in the second item $$\left[ \frac{Io \times K_H \times D \times R4 \times R5}{(R4 + R5) \times R3} \right],$$

the third item [Io×D×Rpgnd], which represents the offset voltage Voffset, may be substantially cancelled out by the second item. In this way, the offset voltage Voffset can be cancelled out from the first reference signal REF1 when referenced to the ground pin GND. In accordance with the exemplary embodiment of FIG. 3, the load regulation compensation module 104 is integrated in the switching converter 300, which substantially eliminates the influence of the offset voltage Voffset to the first reference signal REF1 with respect to the ground pin GND. Thus, the load regulation of the switching converter 300 can be improved.

Figure 4:
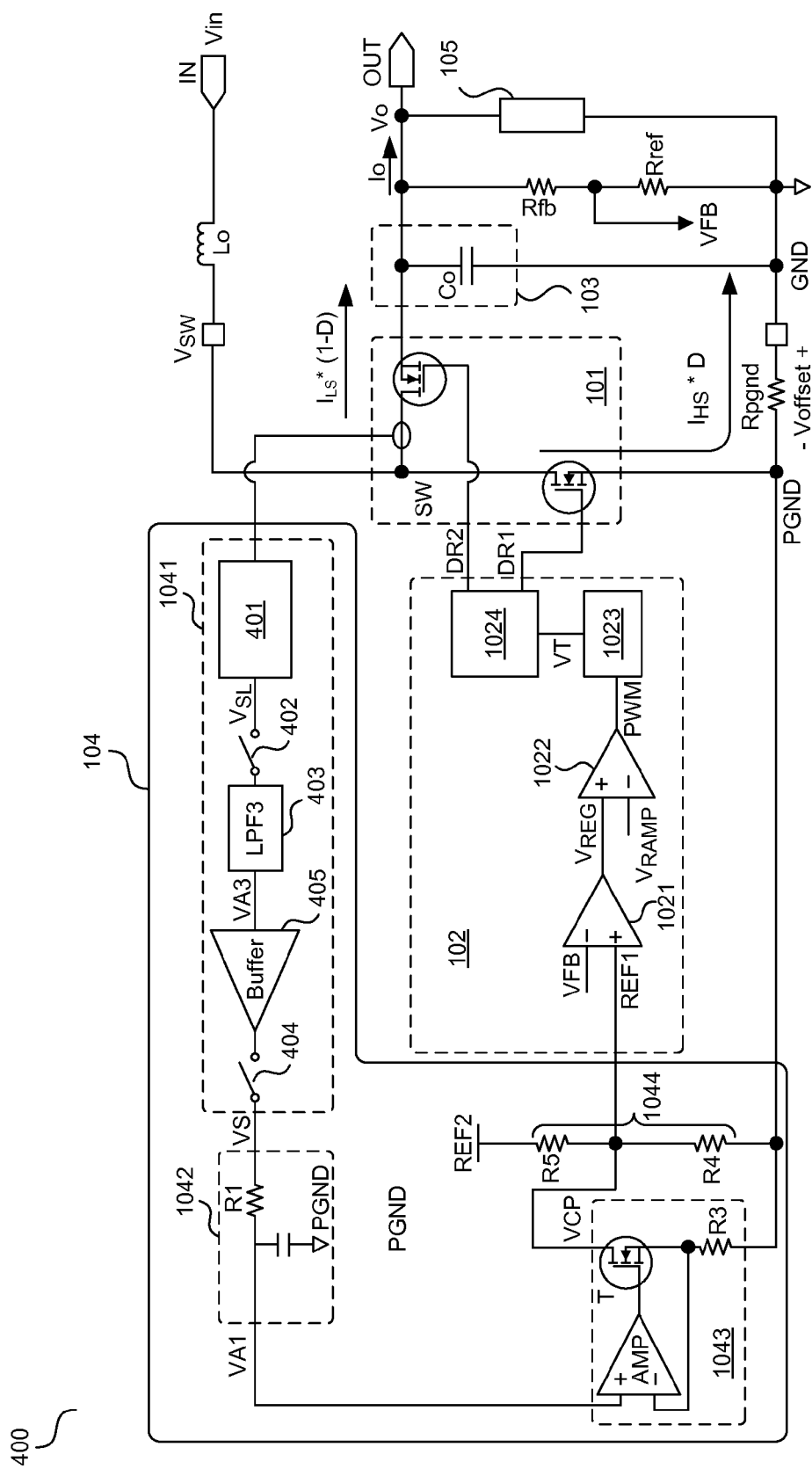
FIG. 4 illustrates a block diagram of a switching converter 400 in accordance with an embodiment of the present invention.

FIG. 4 illustrates a block diagram of a switching converter 400 in accordance with an embodiment of the present invention. Components or structures of the switching converter 400 in FIG. 4 with substantially the same functions as those of the switching converter 300 shown in FIG. 3 are identified by the same reference labels for the sake of simplicity. In FIG. 4, the switching converter 400 has the boost (step-up) type converter topology, thus may be referred to as a boost (step-up) switching converter. The average offset voltage Voffset is resulted from the high side current $I_{HS}$ flowing through the resistive component Rpgnd. Therefore, the load regulation compensation module 104 needs to monitor the high side current IHS to compensate the first reference signal REF1. In the example of FIG. 4, different from the example of FIG. 3, the current sense module 1041 is configured to provide the sense signal VS indicative of the high side current $I_{HS}$ indirectly through sensing the low side current $I_{LS}$.

In accordance with the exemplary embodiment of FIG. 4, the current sense circuit 1041 may comprise: a low side current sense circuit 401, a third switching device 402, a third filtering circuit (LPF3) 403, and a fourth switching device 404. The low side current sense circuit 401 is coupled to the low side switch $M_{LS}$ to sense the low side current $I_{LS}$, and to provide a low side sense signal $V_{SL}$ indicative of the low side current $I_{LS}$. The third switching device 402 has a fifth switch terminal and a sixth switch terminal, wherein the fifth switch terminal is configured to receive the low side sense signal $V_{SL}$, the third switching device 402 is configured to synchronously switch on and off with the low side switch $M_{LS}$ (i.e. the third switching device 402 switches on when the low side switch $M_{LS}$ is switched on, and switches off when the low side switch $M_{LS}$ is switched off) so as to transmit the low side sense signal $V_{SL}$ to the sixth switch terminal during the on time of the low side switch $M_{LS}$. The third filtering circuit 403 has a filter input terminal and a filter output terminal, wherein the filter input terminal is electrically coupled to the sixth switch terminal of the third switching device 402 so as to receive the low side sense signal $V_{SL}$ during the on time of the low side switch $M_{LS}$, the third filtering circuit 403 is configured to provide a third average signal VA3 indicative of the average of the sum of the high side current $I_{HS}$ and the low side current $I_{LS}$ (i.e. the output current Io) at the filter output terminal. The fourth switching device 404 has a seventh switching terminal and an eighth switching terminal, wherein the seventh switching terminal is configured to receive the third average signal VA3, the fourth switching device 404 is configured to synchronously switch on and off with the high side switch $M_{HS}$ (i.e. the fourth switching device 404 switches on when the high side switch $M_{HS}$ is switched on, and switches off when the high side switch $M_{HS}$ is switched off) so as to transmit the third average signal VA3 to the eighth switch terminal during the on time of the high side switch $M_{HS}$. In this way, the signal provided at the eighth switch terminal of the fourth switching device 404 is indicative of an average of the high side current $I_{HS}$ and is provided as the sense signal VS. In accordance with an embodiment of the present invention, the low side current sense circuit 401 has a low side sense gain $K_L$, the low side sense signal $V_{SL}$ can be expressed as $V_{SL}=I_{LS}*K_L$, then the third average signal VA3 can be expressed as $VA3=K_L*Io$, the sense signal VS can be expressed by $VS=K_L*Io*D$.

In accordance with the exemplary embodiment of FIG. 4, the current sense circuit 1041 may further comprise a voltage buffer 405. The voltage buffer 405 is coupled to the filter output terminal of the third filtering circuit 403 to receive the third average signal VA3 at a buffer input terminal, and is coupled to the seventh switch terminal at a buffer output terminal. The voltage buffer 405 is configured to enhance the current driving ability of the third average signal VA3 and to provide the enhanced third average signal at the seventh switch terminal.

In FIG. 4, the first filtering circuit 1042, the gain circuit 1043 and the superposing circuit 1044 of the load regulation compensation module 104 have the same configuration as that shown in FIG. 3. Thus, the first reference signal REF1 of FIG. 4 when referenced to the ground pin GND can be expressed by the expression (4).

$$REF1 \approx \frac{REF2 \times R4}{R4 + R5} - \frac{Io \times K_L \times D \times R4 \times R5}{(R4 + R5) \times R3} + Io \times D \times Rpgnd \quad (4)$$

From the expression (4), it can be seen that through appropriately choosing the low side sense gain $K_L$ and the value of the third resistor R3 in the second item $$\left[\frac{Io \times K_L \times D \times R4 \times R5}{(R4 + R5) \times R3}\right],$$

the third item [Io×D×Rpgnd], which represents the offset voltage Voffset, may be substantially cancelled out by the second item. In this way, the offset voltage Voffset can be cancelled out from the first reference signal REF1 when referenced to the ground pin GND. In accordance with the exemplary embodiment of FIG. 4, the load regulation compensation module 104 is integrated in the switching converter 400, which substantially eliminates the influence of the offset voltage Voffset to the first reference signal REF1 with respect to the ground pin GND. Thus, the load regulation of the switching converter 400 can be improved.

In accordance with the various embodiments described with reference to FIG. 1 to FIG. 4, the switching converters 100, 200, 300 and 400 comprise a load regulation compensation module 104. The load regulation compensation module 104 may be able to compensate the influence of the offset voltage Voffset to the first reference signal REF1, which is used for regulating the output voltage Vo, thereby improving the load regulation performance of the switching converters. The load regulation compensation module 104 in accordance with various embodiments of the present invention is configured to monitor the switching current flowing through the resistive component Rpgnd which results in the offset voltage Voffset, and to cancel the offset voltage Voffset out from the first reference signal REF1 with respect to the ground pin GND based on the monitored switching current. For instance, in the buck switching converters 100 and 200, the switching current flowing through the resistive component Rpgnd is the low side current $I_{LS}$, the load regulation compensation module 104 is configured to provide a sense signal indicative of the low side current $I_{LS}$ directly through sensing the low side current $I_{LS}$ or indirectly through sensing the high side current $I_{HS}$, and then compensate the second reference signal REF2 based on the sense signal (e.g. the sense signal VS) to generate the first reference signal REF1. In the boost switching converters 300 and 400, the switching current flowing through the resistive component Rpgnd is the high side current $I_{HS}$, the load regulation compensation module 104 is configured to provide a sense signal indicative of the high side current $I_{HS}$ directly through sensing the high side current $I_{HS}$ or indirectly through sensing the low side current $I_{LS}$, and then compensate the second reference signal REF2 based on the sense signal (e.g. the sense signal VS) to generate the first reference signal REF1. The load regulation compensation module 104 has simple configuration and is easy to be integrated and fabricated in large scale. The switching converters comprising the load regulation compensation module 104 may achieve high load regulation performance without using expensive extra ground pin or extra flip-chip ground bond pad, saving cost and size of the switching converters.

The advantages of the various embodiments of the present invention are not confined to those described above. These and other advantages of the various embodiments of the present invention will become more apparent upon reading the whole detailed descriptions and studying the various figures of the drawings. For instance, switching converters using constant on time control scheme, such as the switching converters 100, 200, 300 and 400, generally do not include current sense circuit in their control module (e.g. load regulation module 102). However, for the sake of operation safety and load protection, it is often desired to limit the switching current (e.g. the high side current $I_{HS}$ and the low side current $I_{LS}$) of the switching module (101). In accordance with various embodiments of the present invention, the load regulation compensation module 104 comprises the current sense circuit 1041. Therefore, this current sense circuit 1041 may meanwhile be used for switching current limit control, saving circuit components and cost. In addition, the load regulation compensation module 104 according to various embodiments of the present invention can also be employed in switching converters that use voltage mode control scheme. It is well known to one of ordinary skill in the art that a switching converter using voltage mode control generally regulates its output voltage based on a feedback signal indicative of the output voltage and a reference signal indicative of a desired value of the output voltage. In such a switching converter, current information related to the output current, switching current, inductor current etc. are not used, thus no current sense circuit is included in its control circuit.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

We claim:

1. A load regulation compensation module for a switching converter, wherein the switching converter comprises a switch module referenced to an internal reference ground connected to a package ground pin via a resistive component, and wherein the switch module is switched on and off based on a feedback signal indicative of an output voltage of the switching converter and a first reference signal indicative of a desired value of the output voltage, and wherein the on and off switching of the switch module generates a switching current flowing through the resistive component, resulting in an average offset voltage between the internal reference ground and the package ground pin, and wherein the load regulation compensation module comprises:
  a current sense circuit, configured to sense the switching current flowing through the resistive component, and to provide a sense signal indicative of that switching current;
  a first filtering circuit, configured to receive the sense signal, and filter the sense signal to provide a first average signal indicative of an average of the sense signal;
  a gain circuit, configured to receive the first average signal, and to apply a first gain to the first average signal to generate a compensation signal; and
  a superposing circuit, configured to receive the compensation signal and a second reference signal having a bandgap reference voltage with respect to the internal reference ground, and to compensate the second reference signal with the compensation signal to generate the first reference signal, so that the average offset voltage is substantially cancelled out from the first reference signal with respect to the package ground pin.

2. The load regulation compensation module of claim 1, wherein the switch module comprises a high side switch and a low side switch coupled in series between an input port of the switching converter and the internal reference ground, and wherein the high side switch and the low side switch are switched on and off in complementary and generating a high side current and a low side current respectively, and wherein
  the switching current flowing through the resistive component comprises the low side current flowing through the low side switch; and wherein
  the current sense circuit comprises a low side current sense circuit coupled to the low side switch, wherein the low side current sense circuit is configured to sense the low side current and to provide a low side current sense signal indicative of the low side current as the sense signal.

3. The load regulation compensation module of claim 1, wherein the switch module comprises a high side switch and a low side switch coupled in series between an input port of the switching converter and the internal reference ground, and wherein the high side switch and the low side switch are switched on and off in complementary and generating a high side current and a low side current respectively; and wherein
  the switching current flowing through the resistive component comprises the low side current flowing through the low side switch; and wherein
  the current sense circuit comprises a high side current sense circuit, a first switching device, a second filtering circuit, and a second switching device, wherein
  the high side current sense circuit is coupled to the high side switch to sense the high side current, and is configured to provide a high side sense signal indicative of the high side current;
  the first switching device has a first switch terminal and a second switch terminal, wherein the first switch terminal is configured to receive the high side sense signal, and wherein the first switching device is configured to synchronously switch on and off with the high side switch so as to transmit the high side sense signal to the second switch terminal during the on time of the high side switch;
  the second filtering circuit has a filter input terminal and a filter output terminal, wherein the filter input terminal is electrically coupled to the second switch terminal so as to receive the high side sense signal during the on time of the high side switch, and wherein the second filtering circuit is configured to provide a second average signal indicative of an average of the sum of the high side current and the low side current at the filter output terminal; and
  the second switching device has a third switch terminal and a fourth switch terminal, wherein the third switching terminal is configured to receive the second average signal, and wherein the second switching device is configured to synchronously switch on and off with the low side switch so as to transmit the second average signal to the fourth switch terminal during the on time of the low side switch, and wherein the sense signal is provided from the fourth switch terminal.

4. The load regulation compensation module of claim 3, wherein the current sense circuit further comprises:
  a voltage buffer having a buffer input terminal electrically coupled to the filter output terminal of the second filtering circuit to receive the second average signal, and a buffer output terminal electrically coupled to the third switch terminal, wherein the voltage buffer is configured to enhance a current driving ability of the second average signal and to provide the enhanced second average signal at the third switch terminal.

5. The load regulation compensation module of claim 1, wherein the switch module comprises a high side switch and a low side switch coupled in series between an input port of the switching converter and the internal reference ground, and wherein
  the first filtering circuit comprises: a first resistor having a first resistor terminal and a second resistor terminal, wherein the first resistor terminal is configured to receive the sense signal; a first capacitor having a first capacitor terminal and a second capacitor terminal, wherein the first capacitor terminal is coupled to the second resistor terminal, and wherein the second capacitor terminal is connected to the internal reference ground; and a second resistor having a third resistor terminal and a fourth resistor terminal, wherein the third resistor terminal is electrically coupled to the second resistor terminal, and the fourth resistor terminal is configured to provide the first average signal; and wherein
  the gain circuit comprises: the first resistor, the second resistor and a third resistor, wherein the third resistor has a fifth resistor terminal and a sixth resistor terminal, and wherein the fifth resistor terminal is electrically coupled to the fourth resistor terminal, an the sixth resistor terminal is connected to the internal reference ground, and wherein the gain circuit is configured to provide the compensation signal at the fifth resistor terminal; and wherein the superposing circuit comprises the third resistor, a fourth resistor having a seventh resistor terminal and an eighth resistor terminal, and a fifth resistor having a ninth resistor terminal and a tenth resistor terminal, wherein the seventh resistor terminal is electrically coupled to the fifth resistor terminal, the eighth resistor terminal is electrically coupled to the ninth resistor terminal to form a superposing output terminal of the superposing circuit, and wherein the tenth resistor terminal is configured to receive the second reference signal, and the superposing output terminal is configured to provide the first reference signal.

6. The load regulation compensation module of claim 1, wherein the switch module comprises a high side switch electrically coupled between an input port of the switching converter and the internal reference ground, and a low side switch electrically coupled between the input port and an output port of the switching converter, and wherein the high side switch and the low side switch are switched on and off in complementary and generating a high side current and a low side current respectively; and wherein the switching current flowing through the resistive component comprises the high side current flowing through the high side switch; and wherein the current sense circuit comprises a high side current sense circuit coupled to the high side switch, wherein the high side current sense circuit is configured to sense the high side current and to provide a high side sense signal indicative of the high side current as the sense signal.

7. The load regulation compensation module of claim 1, wherein the switch module comprises a high side switch electrically coupled between an input port of the switching converter and the internal reference ground, and a low side switch electrically coupled between the input port and an output port of the switching converter, and wherein the high side switch and the low side switch are switched on and off in complementary and generating a high side current and a low side current respectively; and wherein the switching current flowing through the resistive component comprises the high side current flowing through the high side switch; and wherein the current sense circuit comprises a low side current sense circuit, a third switching device, a third filtering circuit, and a fourth switching device, wherein the low side current sense circuit is coupled to the low side switch, and is configured to sense the low side current to provide a low side sense signal indicative of the low side current;

the third switching device has a fifth switch terminal and a sixth switch terminal, wherein the fifth switch terminal is configured to receive the low side sense signal, and wherein the third switching device is configured to synchronously switch on and off with the low side switch so as to transmit the low side sense signal to the sixth switch terminal during the on time of the low side switch;

the third filtering circuit has a filter input terminal and a filter output terminal, wherein the filter input terminal is electrically coupled to the sixth switch terminal so as to receive the low side sense signal during the on time of the low side switch, and wherein the third filtering circuit is configured to provide a third average signal indicative of an average of the sum of the high side current and the low side current at the filter output terminal; and the fourth switching device has a seventh switching terminal and an eighth switching terminal, wherein the seventh switching terminal is configured to receive the third average signal, and wherein the fourth switching device is configured to synchronously switch on and off with the high side switch so as to transmit the third average signal to the eighth switch terminal during the on time of the high side switch, and wherein the sense signal is provided from the eighth switch terminal.

8. The load regulation compensation module of claim 7, wherein the current sense circuit further comprises:

a voltage buffer having a buffer input terminal electrically coupled to the filter output terminal of the third filtering circuit to receive the third average signal, and a buffer output terminal electrically coupled to the seventh switch terminal, wherein the voltage buffer is configured to enhance a current driving ability of the third average signal and to provide the enhanced third average signal at the seventh switch terminal.

9. The load regulation compensation module of claim 1, wherein the switch module comprises a high side switch electrically coupled between an input port of the switching converter and the internal reference ground, and a low side switch electrically coupled between the input port and an output port of the switching converter, and wherein the first filtering circuit comprises: a first resistor having a first resistor terminal and a second resistor terminal, wherein the first resistor terminal is configured to receive the sense signal; and a first capacitor having a first capacitor terminal and a second capacitor terminal, wherein the first capacitor terminal is electrically coupled to the second resistor terminal, and the second capacitor terminal is connected to the internal reference ground; and wherein the second resistor terminal is configured to provide the first average signal; and wherein the gain circuit comprises: a gain amplifier having a non-inverting input terminal, an inverting input terminal and an amplifier output terminal, wherein the non-inverting input terminal is electrically coupled to the second resistor terminal to receive the first average signal; a gain transistor having a first transistor terminal, a second transistor terminal and a transistor control terminal, wherein the transistor control terminal is electrically coupled to the amplifier output terminal; and a third resistor having a fifth resistor terminal and a sixth resistor terminal, wherein the fifth resistor terminal is electrically coupled to the inverting input terminal of the gain amplifier and the first transistor terminal of the gain transistor, the sixth resistor terminal is connected to the internal reference ground; and wherein the gain circuit is configured to provide the compensation signal at the second transistor terminal; and wherein the superposing circuit comprises a fourth resistor having a seventh resistor terminal and an eighth resistor terminal, and a fifth resistor having a ninth resistor terminal and a tenth resistor terminal, wherein the seventh resistor terminal is connected to the internal reference ground, the eighth resistor terminal is electrically coupled to the ninth resistor terminal to form a superposing output terminal of the superposing circuit, and wherein the tenth resistor terminal is configured to receive the second reference signal, and the superposing output terminal is configured to provide the first reference signal.

10. A switching converter, comprising:
an input port configured to receive an input voltage;
an output port configured to provide an output voltage;
an internal reference ground connected to a package ground pin via a resistive component;
a switch module having a first terminal coupled to the input port, a second terminal coupled to the output port, a third terminal coupled to the internal reference ground, and a fourth terminal configured to receive a control signal, wherein the switch module is configured to switch on and off periodically with a substantially constant on time in response to the control signal to convert the input voltage into the output voltage, and wherein the on and off switching of the switch module generates a switching current flowing through the resistive component, resulting in an average offset voltage between the internal reference ground and the package ground pin;
a load regulation module configured to receive a feedback signal indicative of the output voltage and a first reference signal indicative of a desired value of the output voltage, and configured to provide a regulation signal indicative of a difference between the feedback signal and the first reference signal, and to compare the regulation signal with a sawtooth signal to generate a comparison signal, wherein the comparison signal is configured to trigger a timer to start timing so as to generate the control signal; and
a load regulation compensation module configured to receive a second reference signal having a bandgap reference voltage with respect to the internal reference ground, to monitor the switching current flowing through the resistive component, and to compensate the second reference signal based on the monitored switching current to generate the first reference signal, so that the average offset voltage is substantially cancelled out from the first reference signal with respect to the package ground pin.

11. The switching converter of claim 10, wherein the load regulation module comprises:
a load regulation amplifier having a first amplifier input terminal configured to receive the feedback signal, a second amplifier input terminal configured to receive the first reference signal, and an amplifier output terminal configured to provide the regulation signal;
a comparator having a first comparator input terminal configured to receive the regulation signal, a second comparator input terminal configured to receive the sawtooth signal, and a comparator output terminal configured to provide the comparison signal, wherein the comparison signal is regulated by the regulation signal;
the timer having a timer control terminal configured to receive the comparison signal and a timer output terminal, wherein the timer is triggered by the comparison signal to time for a substantially constant time and to provide a time signal indicative of the constant time at the timer output terminal; and
a logic circuit having a logic input terminal configured to receive the time signal and a logic output terminal, wherein the logic circuit is configured to provide the control signal based on the time signal at the logic output terminal, and wherein the on time of the switch module in each switching period is substantially equal to the constant time.

12. The switching converter of claim 10, wherein the load regulation compensation module comprises:
a current sense circuit, configured to sense the switching current flowing through the resistive component, and to provide a sense signal indicative of that switching current;
a first filtering circuit, configured to receive the sense signal, and filter the sense signal to provide a first average signal indicative of an average of the sense signal;
a gain circuit, configured to receive the first average signal, and to apply a first gain to the first average signal to provide a compensation signal; and
a superposing circuit configured to receive the compensation signal and the second reference signal, and to compensate the second reference signal with the compensation signal to generate the first reference signal.

13. The switching converter of claim 12, wherein the switch module comprises a high side switch and a low side switch coupled in series between the input port and the internal reference ground, and wherein the high side switch and the low side switch are switched on and off in complementary and generating a high side current and a low side current respectively, and wherein
the switching current flowing through the resistive component comprises the low side current flowing through the low side switch; and wherein
the current sense circuit comprises a low side current sense circuit coupled to the low side switch, wherein the low side current sense circuit is configured to sense the low side current and to provide a low side current sense signal indicative of the low side current as the sense signal.

14. The switching converter of claim 12, wherein the switch module comprises a high side switch and a low side switch coupled in series between the input port and the internal reference ground, and wherein the high side switch and the low side switch are switched on and off in complementary and generating a high side current and a low side current respectively; and wherein
the switching current flowing through the resistive component comprises the low side current flowing through the low side switch; and wherein
the current sense circuit comprises a high side current sense circuit, a first switching device, a second filtering circuit, and a second switching device, wherein
the high side current sense circuit is coupled to the high side switch to sense the high side current, and is configured to provide a high side sense signal indicative of the high side current;
the first switching device has a first switch terminal and a second switch terminal, wherein the first switch terminal is configured to receive the high side sense signal, and wherein the first switching device is configured to synchronously switch on and off with the high side switch so as to transmit the high side sense signal to the second switch terminal during the on time of the high side switch;
the second filtering circuit has a filter input terminal and a filter output terminal, wherein the filter input terminal is electrically coupled to the second switch terminal so as to receive the high side sense signal during the on time of the high side switch, and wherein the second filtering circuit is configured to provide a second average signal indicative of an average of the sum of the high side current and the low side current at the filter output terminal; and the second switching device has a third switch terminal and a fourth switch terminal, wherein the third switching terminal is configured to receive the second average signal, and wherein the second switching device is configured to synchronously switch on and off with the low side switch so as to transmit the second average signal to the fourth switch terminal during the on time of the low side switch, and wherein the sense signal is provided from the fourth switch terminal.

15. The switching converter of claim 12, wherein the switch module comprises a high side switch and a low side switch coupled in series between the input port and the internal reference ground, and wherein the first filtering circuit comprises: a first resistor having a first resistor terminal and a second resistor terminal, wherein the first resistor terminal is configured to receive the sense signal; a first capacitor having a first capacitor terminal and a second capacitor terminal, wherein the first capacitor terminal is coupled to the second resistor terminal, and wherein the second capacitor terminal is connected to the internal reference ground; and a second resistor having a third resistor terminal and a fourth resistor terminal, wherein the third resistor terminal is electrically coupled to the second resistor terminal, and the fourth resistor terminal is configured to provide the first average signal; and wherein the gain circuit comprises: the first resistor, the second resistor and a third resistor, wherein the third resistor has a fifth resistor terminal and a sixth resistor terminal, and wherein the fifth resistor terminal is electrically coupled to the fourth resistor terminal, an the sixth resistor terminal is connected to the internal reference ground, and wherein the gain circuit is configured to provide the compensation signal at the fifth resistor terminal; and wherein the superposing circuit comprises the third resistor, a fourth resistor having a seventh resistor terminal and an eighth resistor terminal, and a fifth resistor having a ninth resistor terminal and a tenth resistor terminal, wherein the seventh resistor terminal is electrically coupled to the fifth resistor terminal, the eighth resistor terminal is electrically coupled to the ninth resistor terminal to form a superposing output terminal of the superposing circuit, and wherein the tenth resistor terminal is configured to receive the second reference signal, and the superposing output terminal is configured to provide the first reference signal.

16. The switching converter of claim 12, wherein the switch module comprises a high side switch electrically coupled between the input port and the internal reference ground, and a low side switch electrically coupled between the input port and the output port, and wherein the high side switch and the low side switch are switched on and off in complementary and generating a high side current and a low side current respectively; and wherein the switching current flowing through the resistive component comprises the high side current flowing through the high side switch; and wherein the current sense circuit comprises a high side current sense circuit coupled to the high side switch, wherein the high side current sense circuit is configured to sense the high side current, and to provide a high side sense signal indicative of the high side current as the sense signal.

17. The switching converter of claim 12, wherein the switch module comprises a high side switch electrically coupled between the input port and the internal reference ground, and a low side switch electrically coupled between the input port and the output port, and wherein the high side switch and the low side switch are switched on and off in complementary and generating a high side current and a low side current respectively; and wherein the switching current flowing through the resistive component comprises the high side current flowing through the high side switch; and wherein the current sense circuit comprises a low side current sense circuit, a third switching device, a third filtering circuit, and a fourth switching device, wherein the low side current sense circuit is coupled to the low side switch, and is configured to sense the low side current to provide a low side sense signal indicative of the low side current;

the third switching device has a fifth switch terminal and a sixth switch terminal, wherein the fifth switch terminal is configured to receive the low side sense signal, and wherein the third switching device is configured to synchronously switch on and off with the low side switch so as to transmit the low side sense signal to the sixth switch terminal during the on time of the low side switch;

the third filtering circuit has a filter input terminal and a filter output terminal, wherein the filter input terminal is electrically coupled to the sixth switch terminal so as to receive the low side sense signal during the on time of the low side switch, and wherein the third filtering circuit is configured to provide a third average signal indicative of an average of the sum of the high side current and the low side current at the filter output terminal; and the fourth switching device has a seventh switching terminal and an eighth switching terminal, wherein the seventh switching terminal is configured to receive the third average signal, and wherein the fourth switching device is configured to synchronously switch on and off with the high side switch so as to transmit the third average signal to the eighth switch terminal during the on time of the high side switch, and wherein the sense signal is provided from the eighth switch terminal.

18. The switching converter of claim 12, wherein the switch module comprises a high side switch electrically coupled between the input port and the internal reference ground, and a low side switch electrically coupled between the input port and the output port, and wherein the first filtering circuit comprises: a first resistor having a first resistor terminal and a second resistor terminal, wherein the first resistor terminal is configured to receive the sense signal; and a first capacitor having a first capacitor terminal and a second capacitor terminal, wherein the first capacitor terminal is electrically coupled to the second resistor terminal, and the second capacitor terminal is connected to the internal reference ground; and wherein the second resistor terminal is configured to provide the first average signal; and wherein the gain circuit comprises: a gain amplifier having a non-inverting input terminal, an inverting input terminal and an amplifier output terminal, wherein the non-inverting input terminal is electrically coupled to the second resistor terminal to receive the first average signal; a gain transistor having a first transistor terminal, a second transistor terminal and a transistor control terminal, wherein the transistor control terminal is electrically coupled to the amplifier output terminal; and a third resistor having a fifth resistor terminal and a sixth resistor terminal, wherein the fifth resistor terminal is electrically coupled to the inverting input terminal of the gain amplifier and the first transistor terminal of the gain transistor, the sixth resistor terminal is connected to the internal reference ground; and wherein the gain circuit is configured to provide the compensation signal at the second transistor terminal; and wherein the superposing circuit comprises a fourth resistor having a seventh resistor terminal and an eighth resistor terminal, and a fifth resistor having a ninth resistor terminal and a tenth resistor terminal, wherein the seventh resistor terminal is connected to the internal reference ground, the eighth resistor terminal is electrically coupled to the ninth resistor terminal to form a superposing output terminal of the superposing circuit, and wherein the tenth resistor terminal is configured to receive the second reference signal, and the superposing output terminal is configured to provide the first reference signal.

* * * * *